(12) United States Patent
Reed et al.

(10) Patent No.: US 7,426,916 B2
(45) Date of Patent: Sep. 23, 2008

(54) MULTI-STROKE INTERNAL COMBUSTION ENGINE FOR FACILITATION OF AUTO-IGNITION OPERATION

(75) Inventors: Dennis Reed, Dexter, MI (US); Nate Trask, Dearborn, MI (US); Alex Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 11/554,526

(22) Filed: Oct. 30, 2006

(65) Prior Publication Data

US 2008/0098969 A1 May 1, 2008

(51) Int. Cl.
F02B 3/10 (2006.01)
(52) U.S. Cl. ............... 123/299; 123/305; 123/64
(58) Field of Classification Search ............ 123/299, 123/305, 64
See application file for complete search history.

(56) References Cited

U.S. PATENT DOCUMENTS

| | | | |
|---|---|---|---|
| 6,443,108 B1 | 9/2002 | Brehob et al. | |
| 6,622,690 B2 | 9/2003 | Ando et al. | |
| 6,758,174 B1 | 7/2004 | Fuerhapter | |
| 6,820,587 B1 * | 11/2004 | Hoglund et al. | 123/299 |
| 6,966,309 B1 | 11/2005 | Roberts, Jr. et al. | |
| 7,059,281 B2 * | 6/2006 | Kuo et al. | 123/64 |
| 7,080,613 B2 * | 7/2006 | Kuo et al. | 123/64 |
| 2006/0005788 A1 * | 1/2006 | Kuo et al. | 123/21 |

OTHER PUBLICATIONS

Lang et al., "Thermodynamical and Mechanical Approach Towards a Variable Valve Train for the Controlled Auto-Ignition Combustion Process." SAE International, SAE Technical Paper Series 2005-01-0762, Apr. 11-14, 2005: Detroit Michigan.

* cited by examiner

Primary Examiner—Erick Solis
(74) Attorney, Agent, or Firm—Allan J. Lippa; Alleman Hall McCoy Russell & Tuttle, LLP

(57) ABSTRACT

A method of operating an engine having at least one cylinder including an intake valve and an exhaust valve, the method comprising of injecting a first amount of fuel into the cylinder; auto-igniting a first mixture of air and said first amount of fuel by compressing said first mixture; injecting a second amount of fuel into the cylinder after auto-igniting said first mixture; combusting a second mixture of said second amount of fuel and gasses from auto-ignition of said first mixture; holding an intake valve of the cylinder closed between auto-igniting the first mixture and combusting the second mixture; and exhausting said combusted second mixture.

19 Claims, 11 Drawing Sheets

MULTI-STROKE INTERNAL COMBUSTION ENGINE FOR FACILITATION OF AUTO-IGNITION OPERATION

BACKGROUND AND SUMMARY

Some internal combustion engines may operate with one or more cylinders in what may be referred to as a homogeneous charge compression ignition (HCCI) mode, which includes controlled auto-ignition (CAI) of an air and fuel charge via compression performed by a piston of the cylinder. The HCCI mode may be used in some conditions to provide increased fuel economy and/or reduced emissions. As one example approach, a substantially homogeneous mixture of air and fuel within a cylinder is compressed until auto-ignition of the mixture occurs without necessarily requiring an ignition spark to be performed by a sparking device.

In some conditions, an engine operating in an HCCI mode may have a reduced or limited operating range compared with other types of combustion such as spark ignition (SI). In one approach, as set forth in "Thermodynamical and Mechanical Approach Towards a Variable Valve Train for the Controlled Auto Ignition Combustion Process" SAE article 2005-01-0762, two stroke, six stroke, and eight stroke cycles are described for enabling CAI operation in low speed and low load ranges. As one example, a six stroke cycle is described that includes a first combustion event performed with a lean stratified charge via spark ignition and a second combustion event performed with CAI.

However, the inventors of the present disclosure have recognized some issues with the above approach. As one example, when operating an engine in HCCI mode using a charge that is lean of stoichiometry, the effectiveness of some emission control devices such as a NOx catalyst may be reduced. As such, there may be a trade-off between the application of a lean operation for achieving improved fuel economy and catalyst effectiveness which may be reduced during the lean operation.

As such, in one approach, as described herein, the above issues may be addressed by a method of operating an engine having at least one cylinder including an intake valve and an exhaust valve, the method comprising: injecting a first amount of fuel into the cylinder; auto-igniting a first mixture of air and said first amount of fuel by compressing said first mixture; injecting a second amount of fuel into the cylinder after auto-igniting said first mixture; combusting a second mixture of said second amount of fuel and gasses from auto-ignition of said first mixture; holding an intake valve of the cylinder closed between auto-igniting the first mixture and combusting the second mixture; and exhausting said combusted second mixture.

In this manner, one or more cylinders of an engine may be operated where an initial charge of air is used to provide substantially the entire amount of oxygen used by two separate combustion events. As one example, during the first combustion event, a homogeneous charge of air and fuel may be controlled to be lean of stoichiometry and auto-ignited to take advantage of improved fuel economy of lean operation while the second combustion event via auto-ignition of a second homogeneous charge may include a more stoichiometric mixture of air and fuel, thereby enabling improved catalyst effectiveness when exhausted. However, in some conditions, a second combustion event of the cycle may alternatively include spark ignition to provide residual gas of higher temperature that may be used to facilitate subsequent auto-ignition events.

Further, the inventors of the present application have recognized that operating some or all of the cylinders in a six stroke cycle may result in an increased torque imbalance in the engine or vehicle driveline under some conditions. As such, the present disclosure may address this issue by providing a method for varying an operation of at least a second cylinder between a four stroke cycle including a single combustion event and a six stroke cycle including two combustion events based on operating conditions of the engine. In some examples, the operating conditions may include one or more of a performance mode selected by the driver, a level of vibration produced by the engine and/or transmitted to a driveline of the engine, or a condition of the transmission coupled to the engine.

DETAILED DESCRIPTION

As disclosed herein, one or more cylinders of an engine may be operated in a six stroke cycle while performing a homogeneous charge compression ignition (HCCI) mode. The six stroke cycle may include two separate auto-ignition events performed using at least some of the same initial air charge or substantially the same initial air charge. The first combustion event may be performed on a first mixture of air and fuel lean of stoichiometry, while the second combustion event may be performed on the first combusted mixture with a second injection of fuel to form a second mixture less lean than the first mixture (optionally with additional fresh air). In this manner, the engine may operate at least some cylinders in an HCCI mode while enabling the emission control device to be effective at reducing NOx. Further, HCCI mode can be extended to a greater operating range in some conditions.

Figure 1:
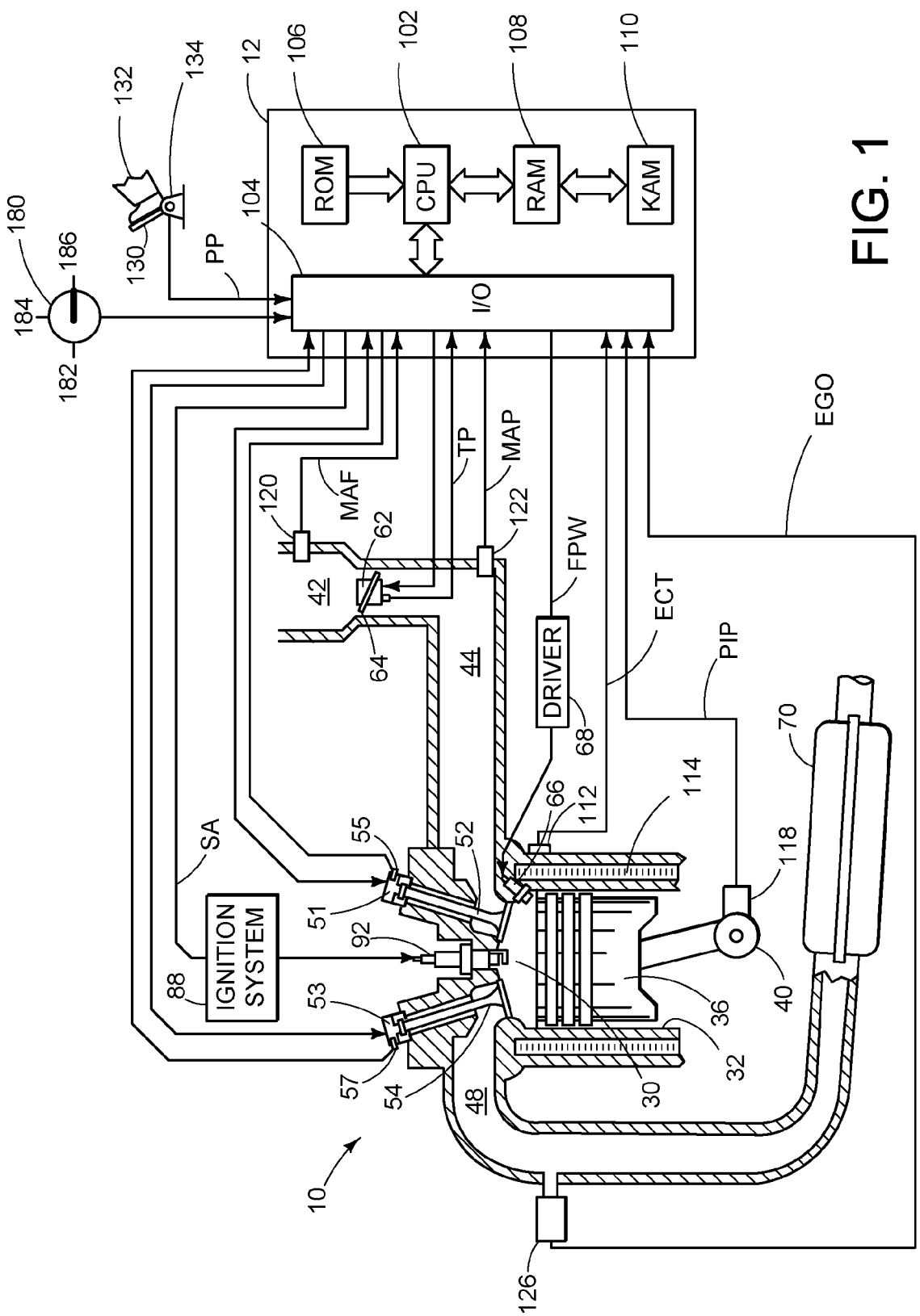
FIG. 1 illustrates an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 variable valve timing actuator (VVTA), which may use an electric, electromagnetic or electro-hydraulic actuator to control the valve timing 51. Similarly, exhaust valve 54 may be controlled by controller 12 via VVTA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged within intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

In some conditions, one or more cylinders of engine 10 may operate in HCCI mode without necessarily requiring an ignition spark to be performed, but instead may utilize compression performed by the piston to auto-ignite a substantially homogeneous mixture of air and fuel within the combustion chamber. However, in some embodiments, an ignition system 88 may be included to provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

As described above, FIG. 1 shows only one cylinder of a multi-cylinder engine, and that each cylinder may similarly include its own set of intake/exhaust valves, fuel injector, spark plug, etc.

Further, in some embodiments, engine 10 may include a mode selection switch 180 that enables a driver of the vehicle to select between one or more performance modes such as a sport mode 182, an economy mode 184, and a luxury mode 186. As will be described in greater detail below, the selection of a particular operating mode via switch 180 may vary how the engine operates. As one example, the control system may employ different strategies when identifying which cylinders of the engine to operate in a SI mode and HCCI mode via one of a four stroke or six stroke cycles, or whether to deactivate cylinders. Further, the selected performance mode may vary other aspects of the engine control including the level of ignition timing retard used, the level of noise and vibration harshness or torque imbalances tolerated, valve timing, or other operating conditions of the engine.

Figure 2:
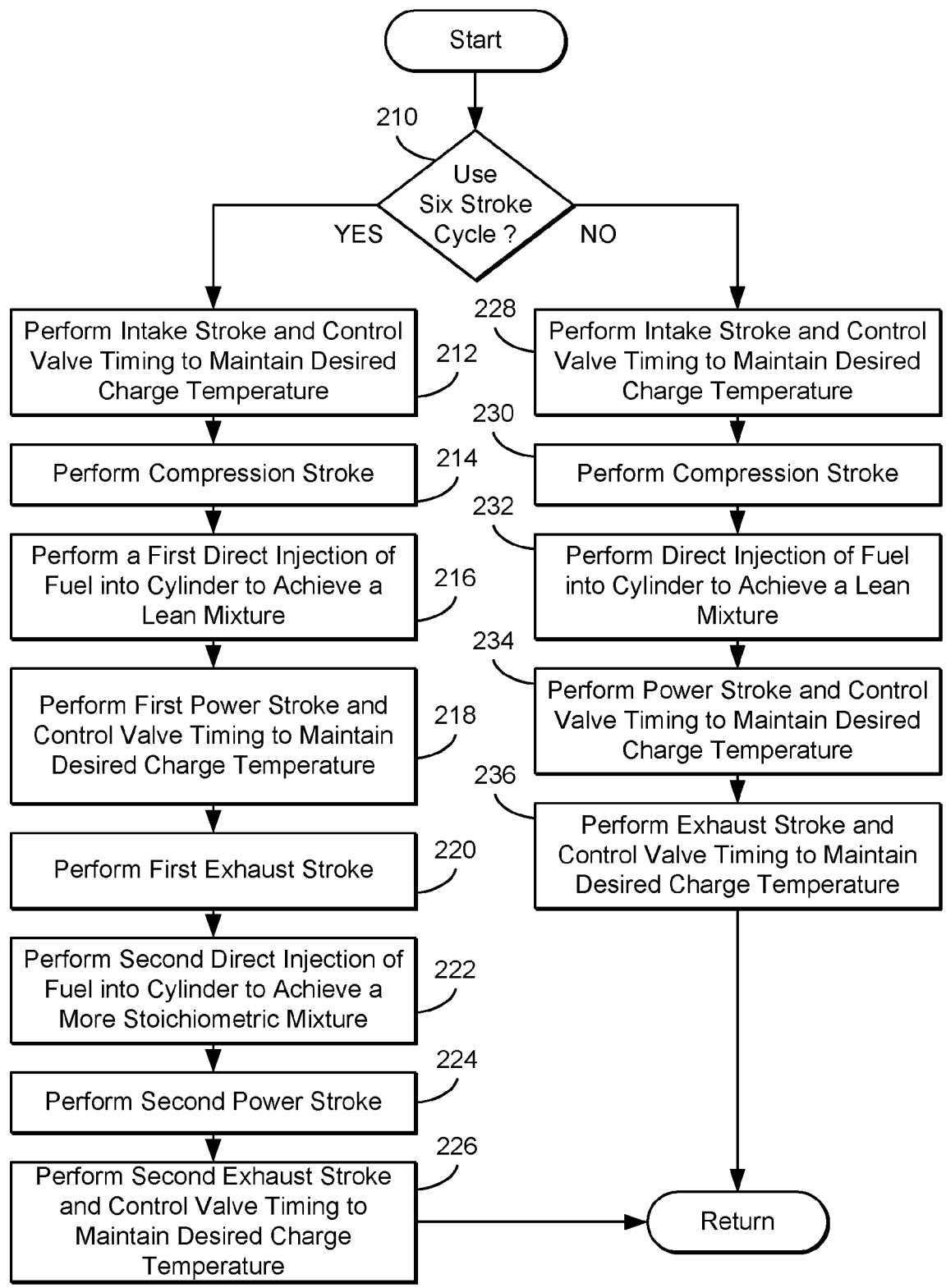
FIG. 2 illustrates a flow chart depicting an example method for controlling a cylinder of an engine between a four stroke and a six stroke mode of operation.

FIG. 2 shows a non-limiting example of a routine that may be performed to operate at least one cylinder of an engine in a six stroke cycle. At 210, it may be judged whether to operate the cylinder in a six stroke cycle based on current and/or predicted future operating conditions. As one example, it may be judged whether to operate one or more of the cylinders in the six stroke mode based on a performance mode selected by the vehicle operator such as via selector switch 180.

For example, selection of the economy mode may cause the engine to operate more or less cylinders in a six stroke cycle to achieve increased fuel economy, which may also result in increased tolerance for torque imbalance, under some conditions. The selection of the economy mode may also increase the use of cylinder deactivation of one or more cylinders to reduce fuel consumption and/or increased use of HCCI mode over spark ignition. As another example, selection of the luxury mode may cause the engine to operate with reduced noise and vibration harshness or torque imbalance while potentially increasing fuel consumption. Thus, the control system may select or vary a number of cylinders operating in the six stroke and four stroke cycles to reduce torque imbalances, an operation that will be described below in greater detail. Further, during a luxury mode operation, the control system may seek to reduce transitions between different modes, thus use of SI may be increased over HCCI operation. As yet another example, selection of a sport mode may cause the engine to operate with increased torque response, which may include reducing or increasing operation of the engine in the six cycle mode to achieve the more rapid torque response. As described below, operation of a cylinder with a six stroke cycle may result in a greater power output density from the cylinder, but may increase torque imbalance in engine.

If the answer at 210 is yes, the cylinder may be controlled to perform a greater than four stroke cycle (e.g., six stroke cycle) including two power strokes which may or may not be based on substantially the same initial air charge. For example, at 212, the intake stroke may be performed and the valve timings may be varied to maintain the desired charge temperature for achieving auto-ignition via the first power stroke of the cycle. Alternatively, if the engine is to operate in SI mode for the first power stroke, the valve timings may be adjusted to regulate charge temperature.

As one example, for HCCI operation, one or more intake valves may be opened late reducing the escape of the trapped exhaust gas while still enabling a suitable amount of air to be drawn into the cylinder from the intake manifold. The intake valve may be closed after bottom dead center. However, other valve timings may be used to maintain a suitable charge temperature for facilitating the desired auto-ignition timing. At 214 a compression stroke and a first injection of fuel may be performed at 216, for example, by a direct injector to achieve a first mixture of air and fuel lean of stoichiometry (e.g. including excess oxygen). As one example, the mixture for the first charge of the cycle may have an air to fuel ratios in the range of greater than 30 to 1 and/or less than 100 to 1, although it should be appreciated that other suitable ratios may be used to achieve a lean mixture. For example, air to fuel ratios greater than 100 to 1 or less than 30 to 1 may be used. As one example, a first mixture having an air to fuel ratio of 50 to 1 may be used for the first power stroke.

At 218, a first power stroke may be performed accompanied by ignition of the air and fuel charge. In the case of HCCI mode operation, the ignition of the charge may include auto-ignition without necessarily requiring an ignition spark. However, in some examples, an ignition spark may be used to assist in achieving auto-ignition or combustion of the mixture. During the power stroke, only some of the air within the cylinder may be used during combustion of the fuel due to the lean mixture including at least some excess oxygen. At around bottom dead center after the power stroke, one or more valves may be operated to maintain the desired charge temperature. For example, one or more of the exhaust valves may be opened to release some of the exhaust gas, thereby reducing the combustion chamber temperature to a suitable level for a subsequent auto-ignition event to initiate a power stroke.

In some embodiments, the intake valve may be held closed between the first combustion event and the subsequent second combustion event of the cycle. At 220, a second exhaust stroke may be performed followed by a second direct injection of fuel into the cylinder at 222. The second injection of fuel may be controlled to achieve a mixture closer to stoichiometry (i.e. less lean) than the first injection. For example, the second fuel injection may be controlled to create a stoichiometric mixture (e.g. including less excess oxygen than the first power stroke) with product of the first combustion event remaining in the cylinder for the second combustion event of the cycle. At 224, a second power stroke may be performed including ignition of the air and fuel mixture via auto-ignition without necessarily requiring an ignition spark. However, in some examples, the second combustion event may be initiated by an ignition spark performed by a spark plug. At 226, an exhaust stroke may be performed wherein the valve timings are controlled to maintain the desired cylinder temperature via trapped exhaust gas for the subsequent cycle. Next, the routine may return to 210 for the subsequent cycle.

Alternatively, if the answer at 210 is no, a four stroke cycle may be performed including an intake stroke 228, a compression stroke 230, a direct injection of fuel at 232, a power stroke 234 and an exhaust stroke 236. During four stroke operation, combustion of an air and fuel mixture may include auto-ignition (e.g. HCCI) or spark ignition of a homogeneous or non-homogeneous mixture.

In this manner, by performing a six cycle operation at least during some conditions, the amount of gases including excess oxygen exhaust from the cylinder during the first lean combustion event may be reduced, thereby reducing the amount of excess oxygen received by an emission control device (e.g. three-way catalyst) downstream of the cylinder. The reduction in the level of oxygen reaching the catalyst may improve catalyst operation, under some conditions. Further, the excess oxygen remaining in the cylinder after the first combustion event may be consumed during a second combustion event of the cycle before being exhausted. Thus, a larger portion of the exhaust gases received by the emission control device may include a lower concentration of excess oxygen, thereby improving the effectiveness of the catalyst at reducing some products of combustion.

In some conditions, variations or alternatives of the above routine may be used. As one example, where the cylinder of an engine includes a direct injector and a port injector, the first injection of fuel (e.g. at 216) may alternatively include at least a port injection and the second injection of fuel (e.g. at 222) may include at least a direct injection of fuel. As another example, both combustion events (e.g. during the expansion strokes of 218 and 224) may include auto-ignition without a spark. Alternatively, one or both of the combustion events may be initiated by an ignition spark. For example, the first combustion event of the cycle may include a controlled auto-ignition and the second combustion event may include spark initiated combustion. As yet another example, more than six strokes may be used. For example, a cylinder may be operated with a cycle including at least three compression strokes each followed by a subsequent expansion stroke. In other words, a cycle may utilize three or more combustion events where the first combustion event includes a first lean mixture, the second combustion event includes a second mixture less lean than the first mixture, and the third combustion event includes a third mixture less lean than the second mixture.

While the above examples are described with reference to a single cylinder of an engine, it should be appreciated that one or more cylinders of the engine may utilize a six stroke cycle or a four stroke cycle as described above with reference to FIG. 2. For example, all of the engine cylinders may be operated with six strokes per cycle or a portion of the cylinders may be operated with six strokes while a portion of the cylinders are operated with four strokes. As another example, some of the cylinders may be deactivated (i.e. not carrying out combustion) while some of the cylinders are operated with four strokes and/or six or more strokes per cycle. Further, one or more of the cylinders of the engine may be controlled to transition between operation in four strokes, six strokes, or more strokes based on operating conditions of the vehicle. As described herein, operating conditions may include spark timing, intake and exhaust valve timing, turbocharging or supercharging conditions, ambient conditions such as temperature and pressure, requested output of the engine such as torque or speed, cylinder operating configurations, fuel type, fuel vapor purging conditions, catalyst conditions, selected performance mode, and others.

Figure 3A:
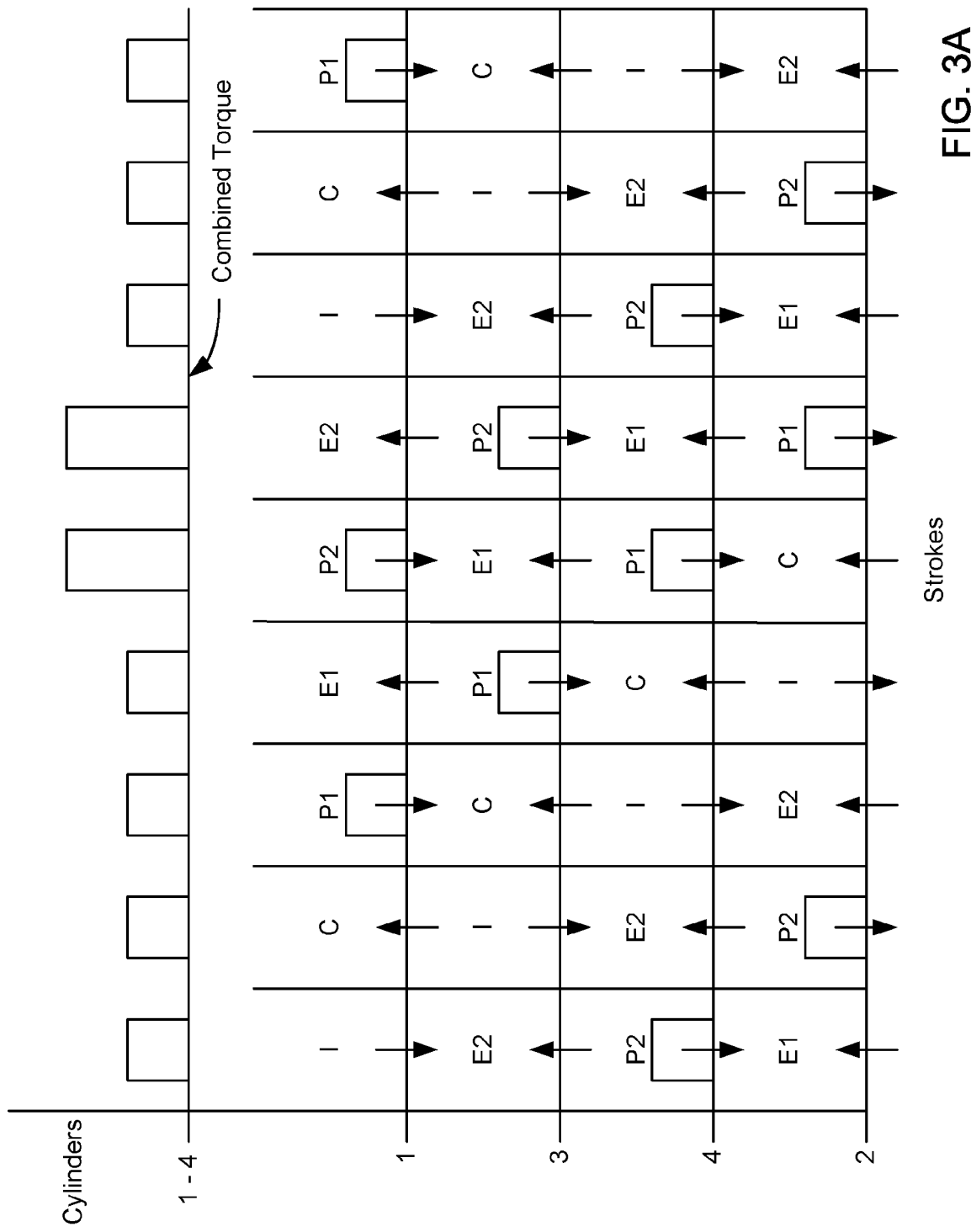
FIGS. 3A and 3B illustrate timing diagrams for an example four cylinder engine.
Figure 3B:
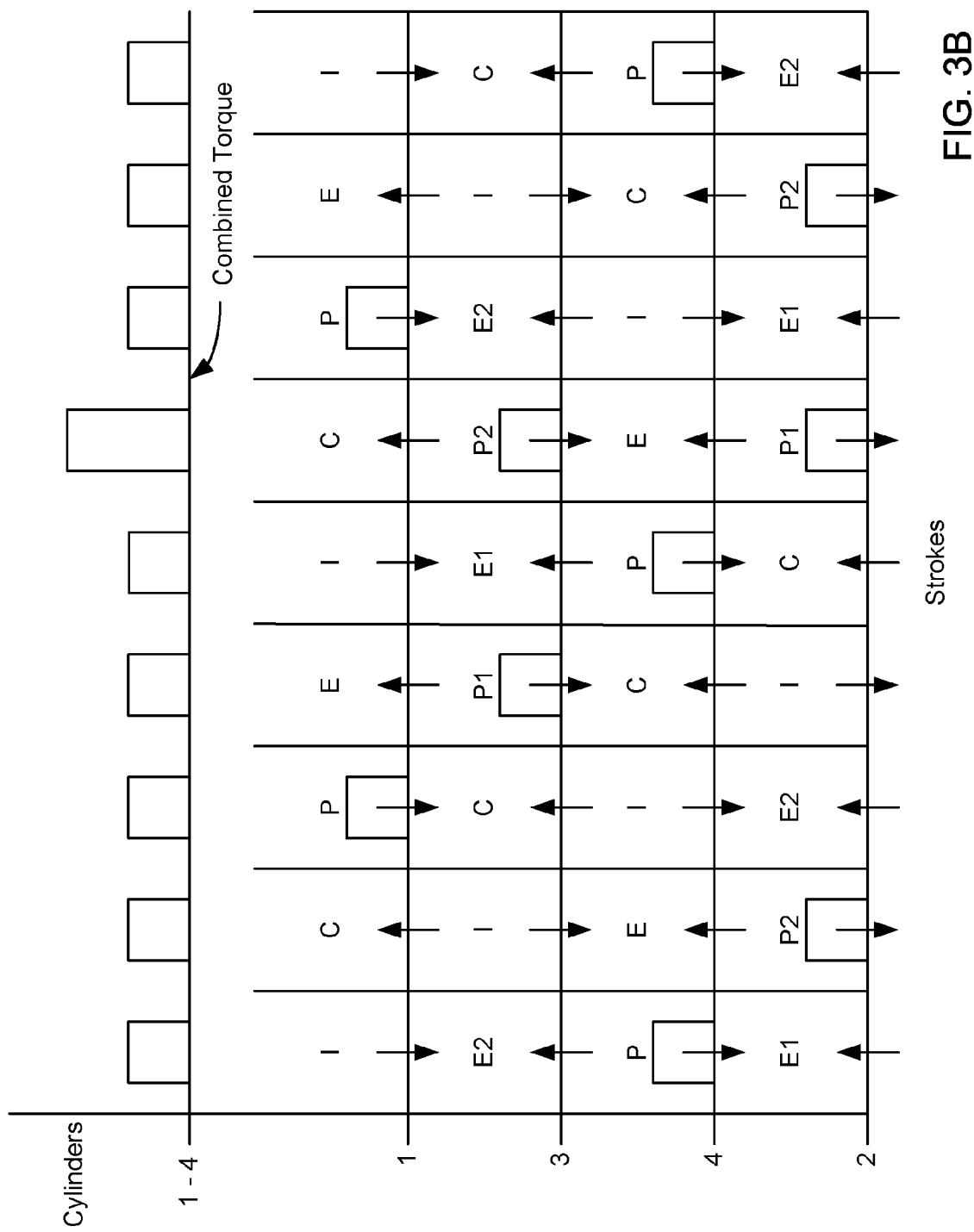

In some conditions, operation of one or more cylinders of the engine in a six stroke cycle may increase the potential for torque imbalance. FIGS. 3A and 3B show timing diagrams for an example four cylinder engine. FIG. 3A shows the four cylinder engine operating with each cylinder carrying out a six stroke cycle while 3B shows the four cylinder engine operating with some cylinders carrying out combustion in a four stroke cycle and some cylinders with a six stroke cycle. The horizontal axis of the diagrams shown in FIGS. 3A and 3B represents consecutive strokes while the vertical axis represents the cylinders of the engine. In particular, the lower portion of the diagram includes cylinders 1-4 of the inline four cylinder engine and the upper portion includes the combined torque of all cylinders of the engine. Within the diagram, the intake stroke (I), compression stroke (C), power stroke (P), and exhaust stroke (E) are shown. Further, some strokes such as the power and exhaust strokes include numbers such as "P1" or "P2" which correspond to the first and the second power strokes of the cycle, respectively. The direction of travel of the piston is also indicated below the corresponding stroke label. A down arrow represents that the piston is moving away from the top of the cylinder during the stroke while the upper arrow represents that the piston is moving toward the top of the cylinder during the stroke.

In this example, each of the four cylinders are offset from each other by a crank angle of approximately 180°. Thus, during a six stroke cycle as shown in FIG. 3A, while cylinder 1 is performing the intake stroke, cylinder 3 is performing an exhaust stroke, cylinder 4 is performing a power stroke, and cylinder 2 is performing an exhaust stroke. The combined torque shown on the upper portion of the diagram shows how torque imbalance may occur as represented by an increase in torque during some strokes. Such an increase in torque may be caused by the summation of two or more power strokes occurring within the same stroke. For example, in FIG. 3A, an increase in engine torque occurs when both cylinder 1 and cylinder 4 have concurrent power strokes and again when cylinder 3 and cylinder 2 have concurrent power strokes.

FIG. 3B shows an example timing diagram illustrating how the combined torque produced by the engine may differ depending on the multi-stroke mode used by each cylinder. For example, cylinders 2 and 3 are shown operating in a six stroke cycle while cylinders 1 and 4 are shown operating in a four stroke cycle, which is in contrast to an operation where all of the cylinders are operated in the six stroke cycle as illustrated by FIG. 3A. Thus, FIGS. 3A and 3B show how the variations in torque that may cause torque imbalance may be increased or reduced by varying the number of stroke performed per cycle of each cylinder of the engine.

Figure 4:
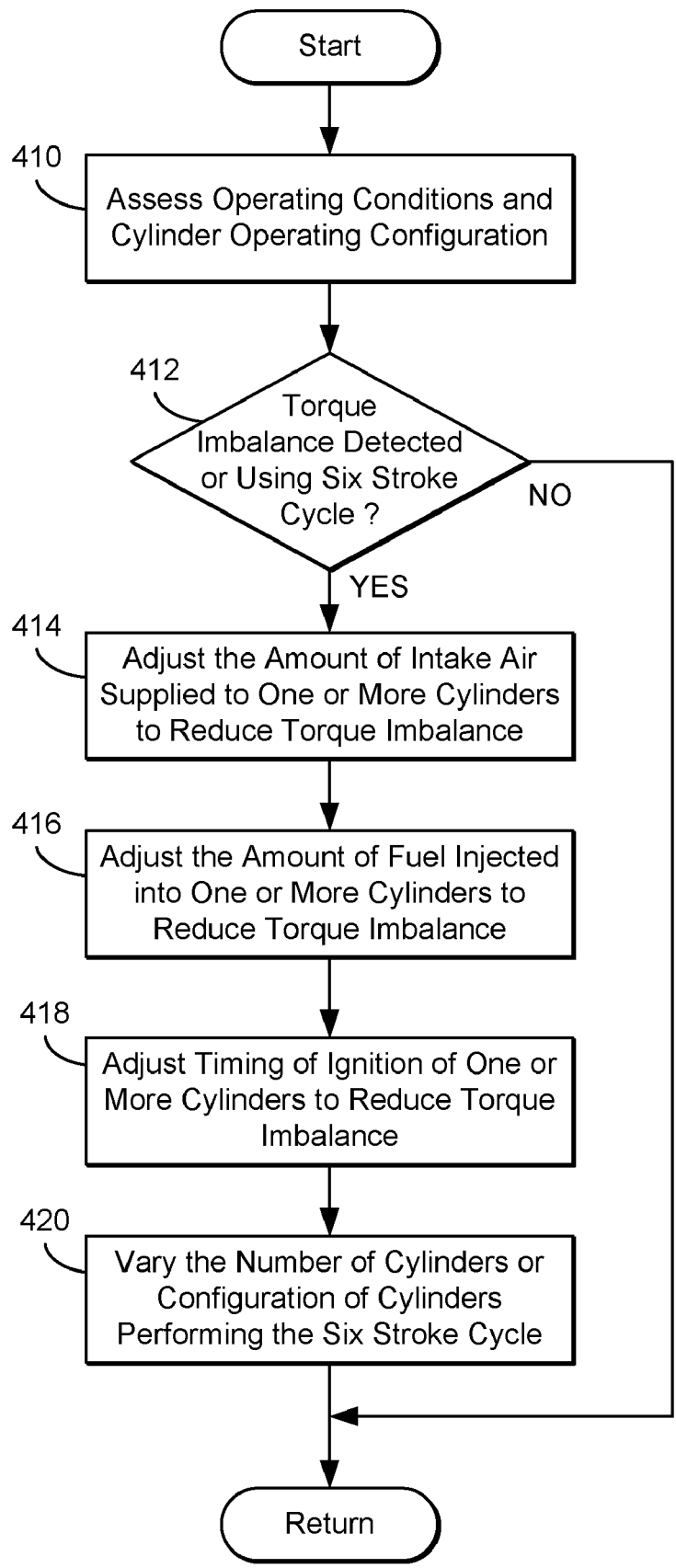
FIG. 4 illustrates a flow chart depicting an example method for reducing vibration in an engine having at least one cylinder operating in a six stroke cycle.

In some conditions, a torque imbalance may be reduced or eliminated by adjusting one or more operating conditions of the engine. FIG. 4 shows a non-limiting example of a routine that may be performed to reduce torque imbalance when at least one cylinder of the engine is operated with a cycle having two or more combustion events (e.g. six strokes). At 410, the control system may assess the current and/or predicted future operating conditions as well as the cylinder operating configuration. The cylinder operating configuration in this example may correspond to information such as the number of cylinders of the engine utilizing four strokes, six strokes, greater than six strokes, the location of each of the cylinders with respect to the number of strokes performed, the firing order of each of the cylinders with respect to the number of strokes performed, the total number of cylinders of the engine, the number of deactivated cylinders, and may be based on the selected performance mode. At 412, it may be judged whether a torque imbalance has been detected and/or whether one or more cylinders are operating in a six stroke cycle or are to be transitioned to a six stroke cycle.

As one example, the control system may predict a torque imbalance based on the assessed operating conditions and/or cylinder operating configuration. For example, based on the cylinder operating configuration, it may be predicted that a torque imbalance may occur at certain combinations of six cycle operation, four cycle operation and/or cylinder deactivation, where these combinations may be avoided or reduced. Some combinations of six cycle operation are provided herein with reference to FIGS. 5-13.

As another example, torque imbalance may be detected by one or more of torsional acceleration of the crankshaft, active engine mounts with sensors, torque sensors, vibration sensors, noise sensors, accelerometers, combustion sensors, among other suitable sensors that be communicatively coupled to the control system of the engine to provide an indication of torque imbalance. Further, torque imbalances may be detected or predicted based on operating conditions such as a level of vibration detected in the transmission or driveline of the vehicle.

If the answer at 412 is no, the routine may return to 410. Alternatively, if the answer at 412 is yes, the amount of intake air supplied to one or more cylinders of the engine may be varied, for example, by varying intake and/or exhaust valve timing of the corresponding cylinder to reduce the torque imbalance. As one example, if all of the cylinders are operating with a six stroke cycle, then intake air supplied to one, some, or all of the cylinders may be increased and/or decreased to achieve a reduced torque imbalance for the engine. As another example, if some of the engine cylinders are operating in a six stroke cycle and some of the engine cylinders are operating in a four stroke cycle or are deactivated, then the amount of intake air supplied to the cylinders operating with six strokes and with four strokes may be varied differently.

Alternatively or in addition to the reduction of intake air at 414, the amount of fuel injected into one or more cylinders may be varied to reduce torque imbalances. As one example, the amount of fuel injected into one or more cylinders operating in a six stroke cycle may be increased/decreased and/or fuel injected into one or more cylinders operating in a four stroke cycle may be increase/decreased to achieve reduced torque imbalance.

Alternatively or in addition to the operations performed at 414 and/or 416, at 418 the ignition timing of one or more cylinders may be adjusted to reduce torque imbalances. For example, a level of torque produced by a cylinder may be reduced by retarding ignition of the air and fuel mixture.

Alternatively or in addition to the operations performed at 414, 416, and/or 418, at 420 the number of cylinders or the configuration of cylinders performing a six stroke cycle may be adjusted to reduce torque imbalances. For example, one or more cylinders that are operating in a four stroke cycle can be transitioned to a six stroke cycle or vice versa. As another example, torque imbalance may be reduced while maintaining a similar number of cylinders carrying out four and six stoke cycles. For example, a first cylinder can be transitioned from a six stroke cycle to a four stroke cycle while a second cylinder can be transitioned from a four stroke cycle to a six stroke cycle. In this manner, one or more of the operations described above wither reference to 414-420 may be performed to reduce torque imbalances. Finally, the routine may return to 410.

Figure 8:
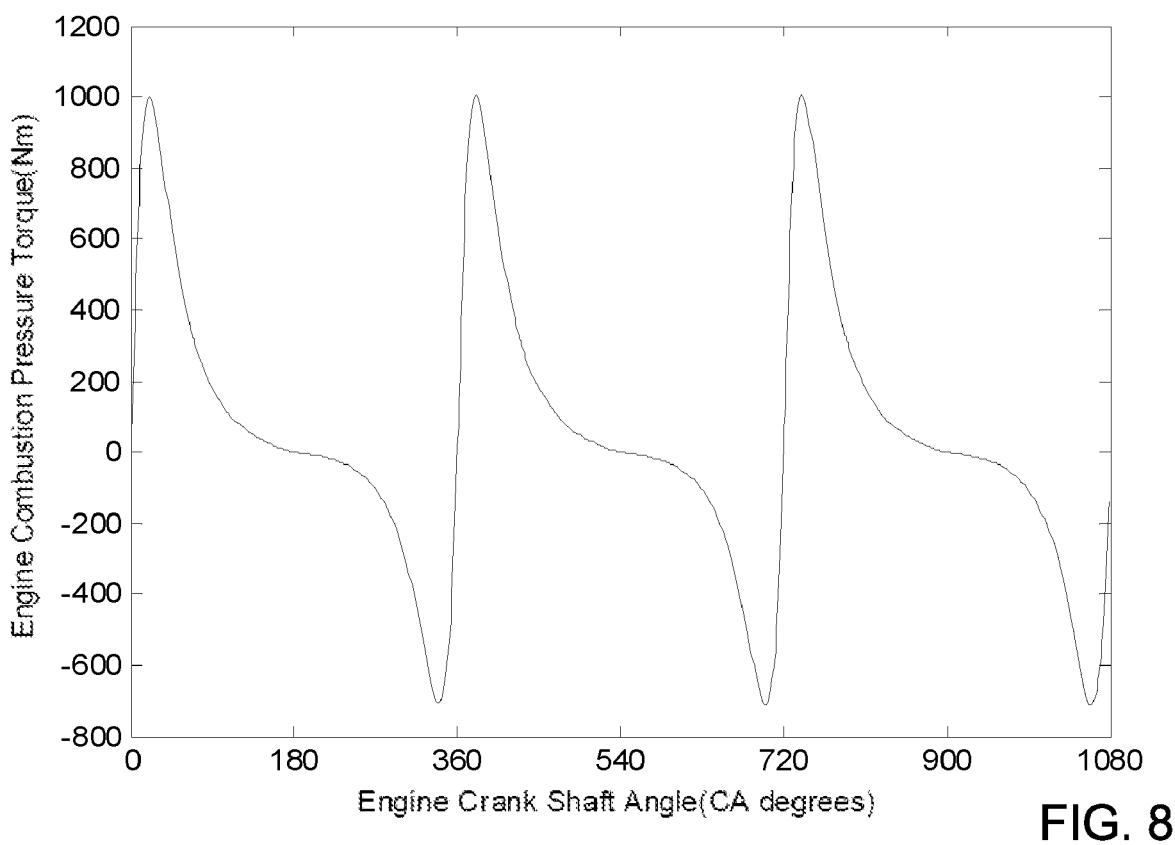
Figure 11:
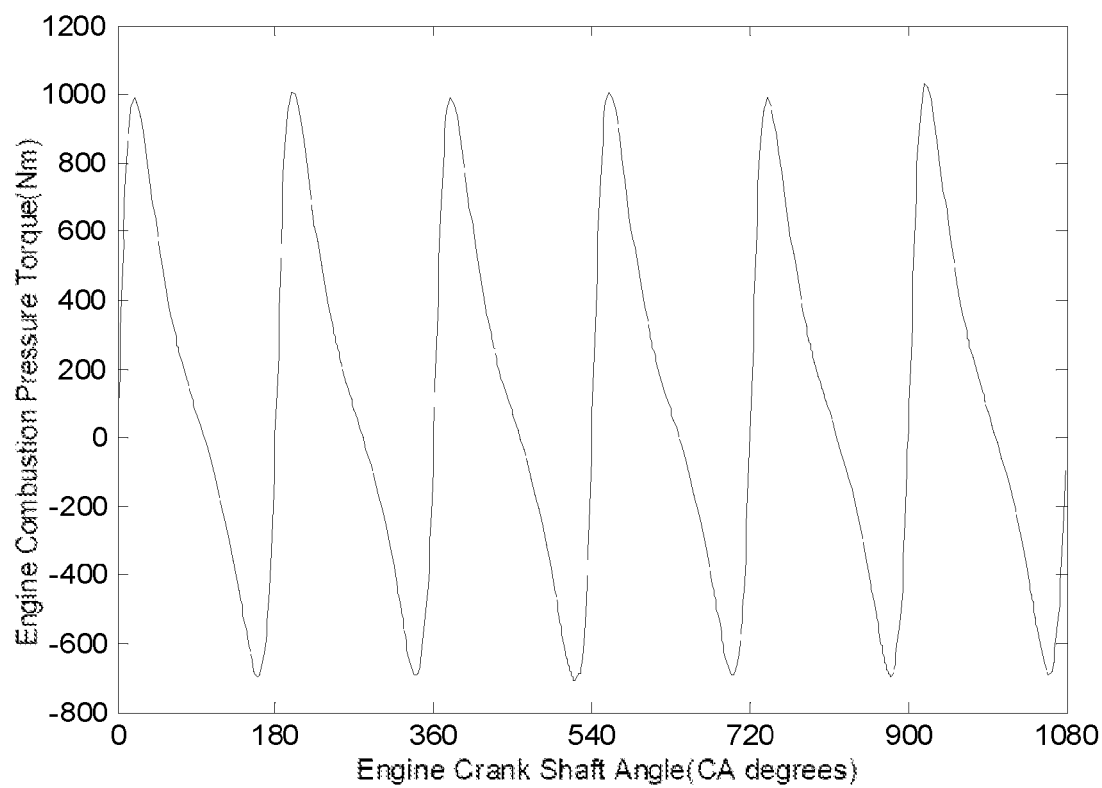

As one example embodiment, an engine can operate with three cylinders or six cylinders in a six stroke cycle while the remaining cylinders are deactivated in order to reduce torque imbalances by maintaining substantially equivalent torque pulsations as shown in FIGS. 8 and 11. As another example, a combination of six stroke and four stroke cylinders may be used to achieve the desired combination of fuel consumption, noise and vibration harshness (NVH) and/or level of emissions. For example, a first bank of cylinders may operate in a four stroke configuration while a second bank of cylinders may operate in a six stroke configuration. Further deactivation of one or more cylinders can be used in addition to combinations of six stroke and/or four stroke cylinders.

A combination of four and six stroke cylinders may be achieved with regards to an EVA engine by adjusting the intake valve timing and/or the exhaust timing on an individual cylinder basis or on a bank basis. Engines utilizing cam actuation may vary the cam phaser or use selective valve deactivation to provide the desired valve timing for four or six stroke operation.

While the above examples described with reference to FIG. 4 show how torque imbalances during conditions where at least one cylinder of the engine is operating in a six stroke cycle, may be reduced by varying the intake air and/or fuel injection it should be appreciated that other operating conditions may be adjusted to achieve a reduction in torque imbalance.

Figure 6:
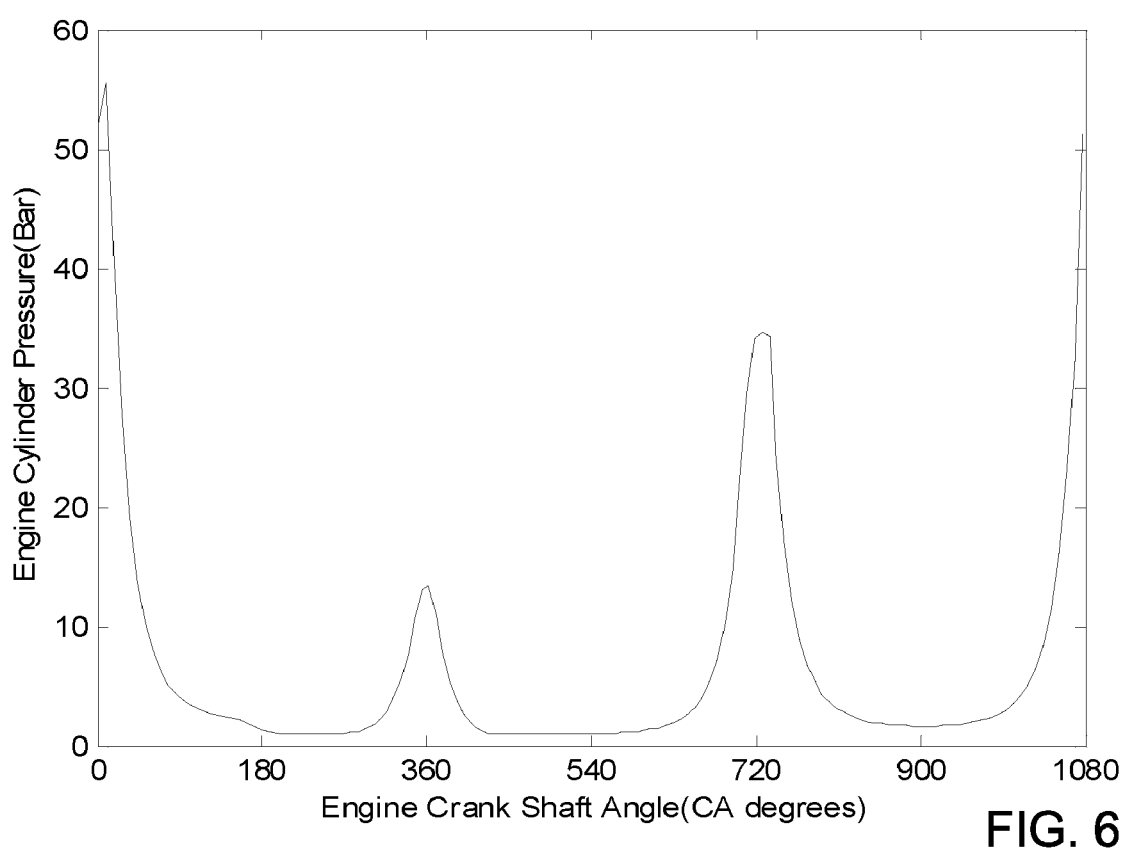
Figure 7:
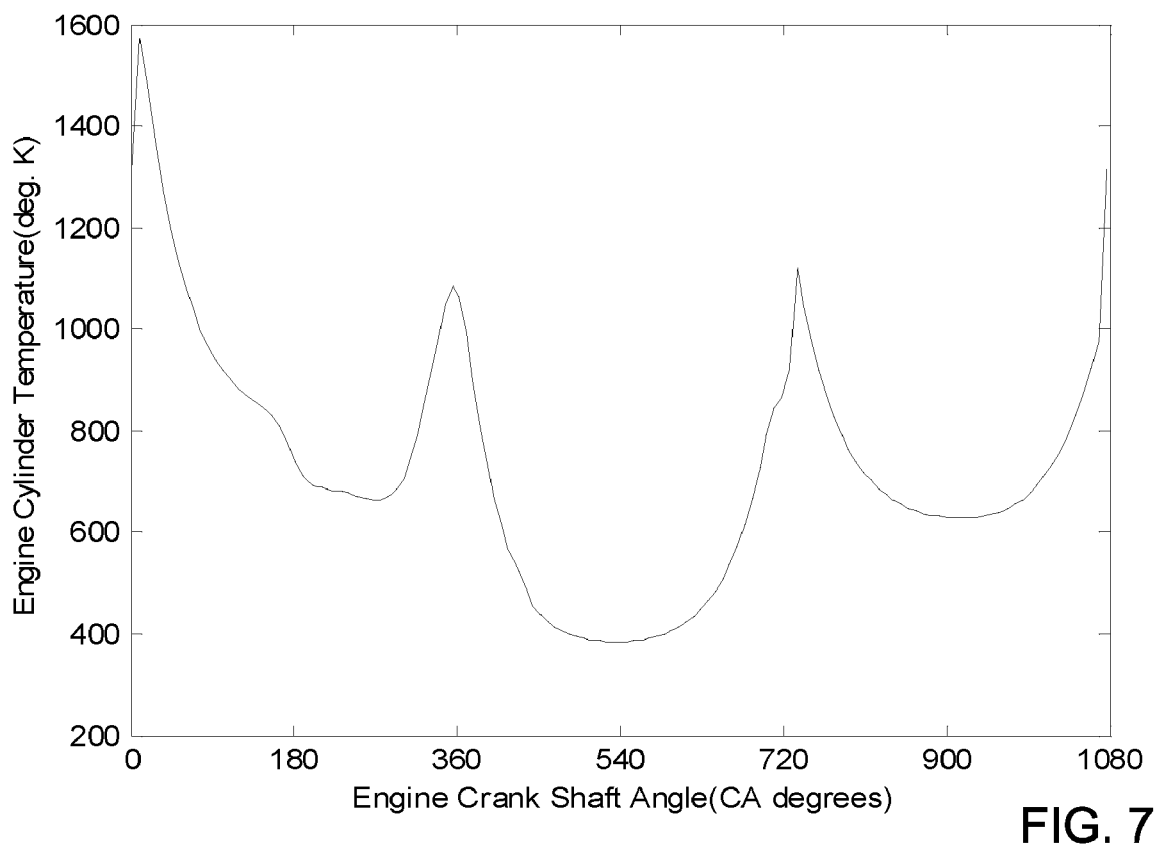

To examine the impact of six stroke operation on the engine torque output, a cylinder-by-cylinder intake VVTA (iVVTA) Simulink simulation was developed with six stroke and HCCI functionality. In the simulation runs, the exhaust valve was opened at 60° before bottom dead center (BBDC) of piston position, 180-60° crank angle (CA), and closed 60° before top dead center (BTDC), 360-60° CA. The intake valve was opened 60° ATDC, 360+60° CA, and closed at BDC, 540° CA. This provided negative valve overlap for HCCI combustion on the first combustion event at 720+10° CA. The intake and exhaust valves were not opened between 720° and 1080° CA. The resulting cylinder torque, pressure and temperature traces as a function of crank angle are shown in FIGS. 5-7.

Figure 5:
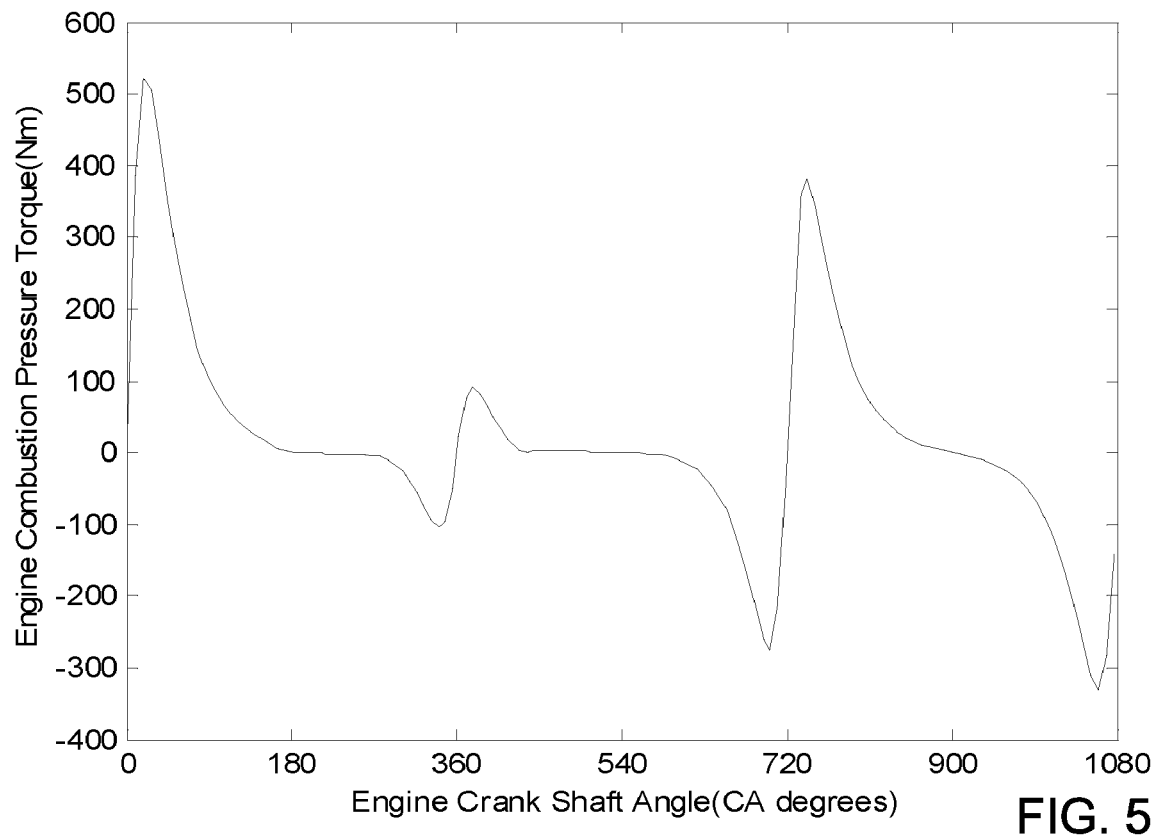
FIGS. 5-13 are graphs illustrating a prophetic example experiment.

In particular, FIG. 5 shows combustion pressure torque for a six stroke per cylinder having an iVVTA system with lean HCCI combustion on the first combustion event (at 720+10° CA) and a stoichiometric combustion on the second combustion event (at 1080+10° CA). FIG. 6 shows a six stroke iVVTA cylinder pressure with lean HCCI combustion on the first combustion event (at 720+10° CA) and stoichiometric combustion on the second combustion event (at 1080+10° CA). FIG. 7 shows a six stroke iVVTA cylinder temperature with lean HCCI combustion on the first combustion event (at 720+10° CA) and stoichiometric combustion on the second combustion event (at 1080+10° CA).

The resulting pressure, temperature and torque near the second HCCI combustion event exhibit a compression and combustion temperature, pressure and peak-to-peak torque greater than the first combustion event. The increase in these factors may be the result of a higher cylinder temperature at the beginning of the compression stroke between 900° and 1080° CA, see FIG. 7. The higher cylinder temperature at 900° may also lead to higher compression and combustion pressure and a larger peak-to-peak torque during the second combustion event. By opening the intake and/or exhaust valve (s) near 900° CA it may be possible to reduce the cylinder gas temperature and even out the torque generated by the two combustion events during the 6-stroke cycle.

Figure 9:
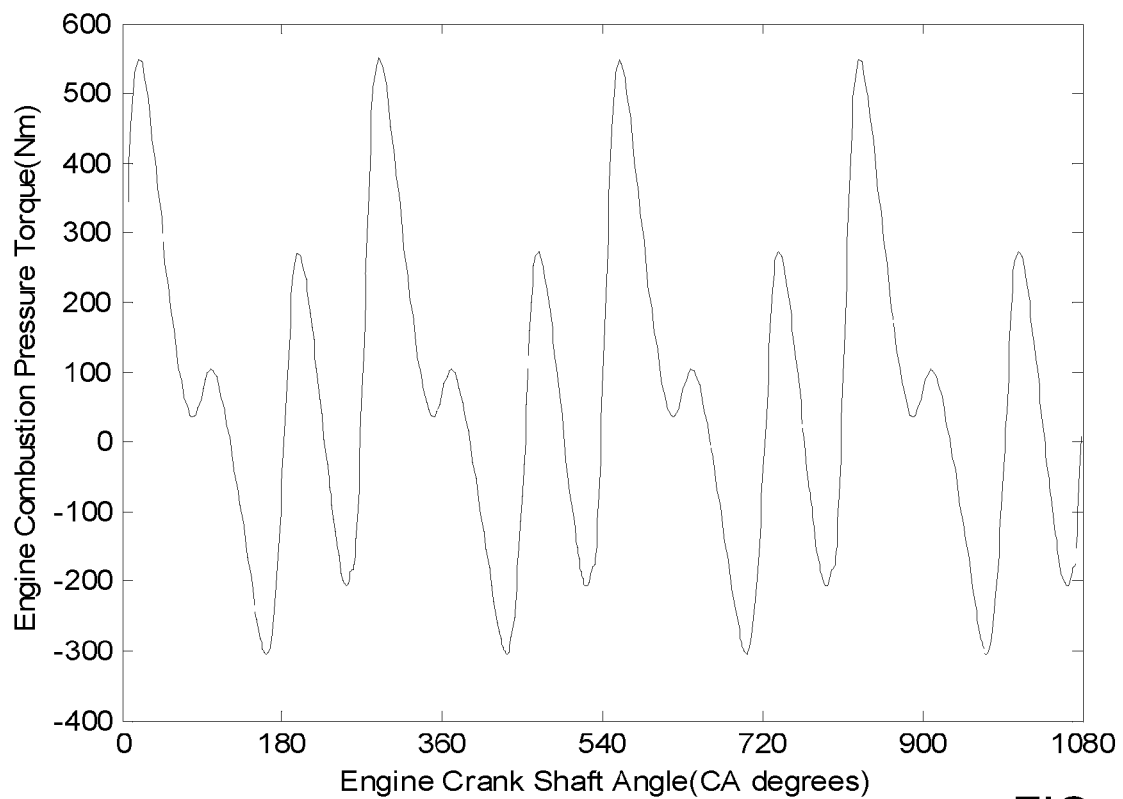
Figure 10:
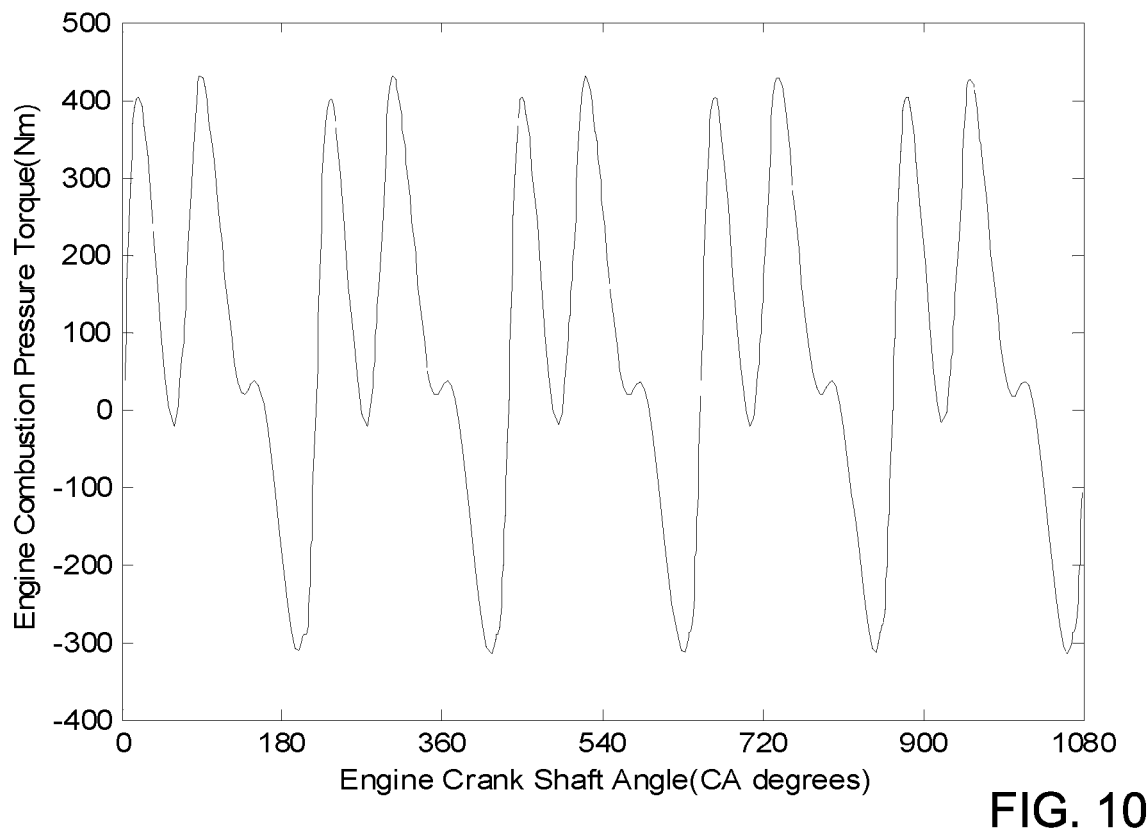
Figure 12:
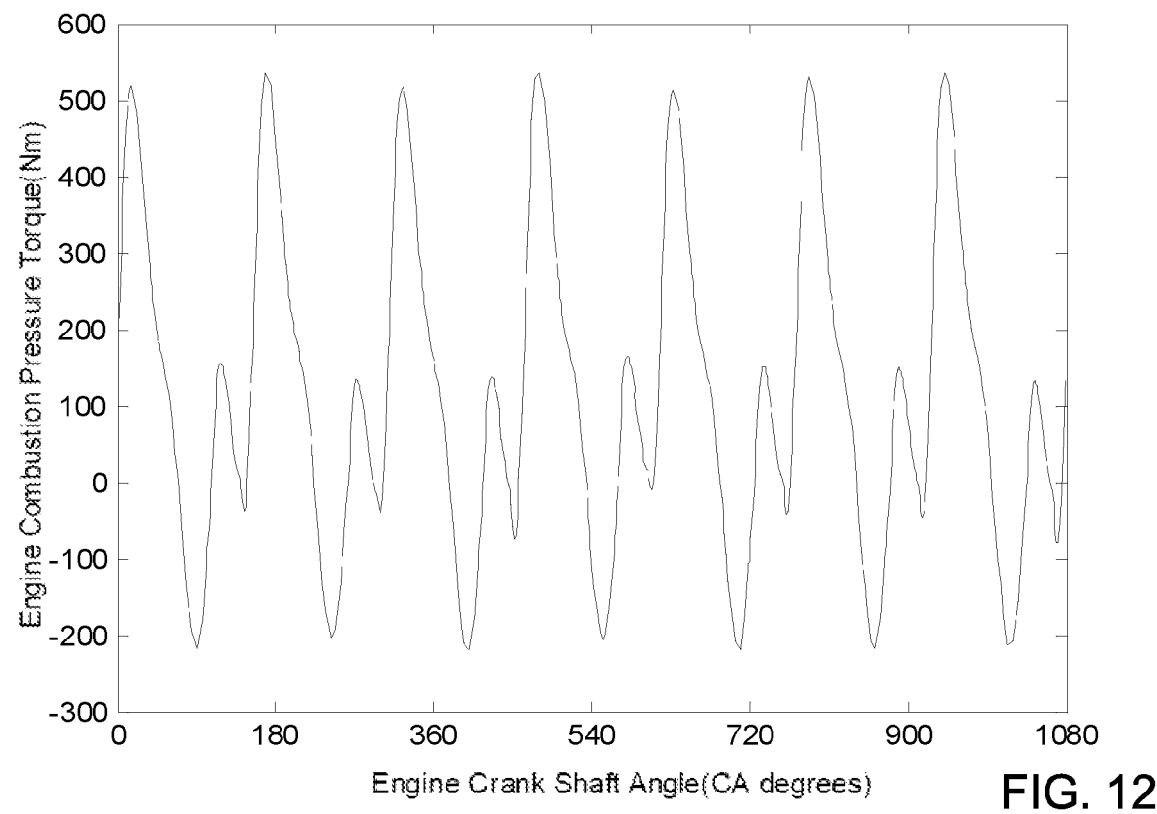
Figure 13:
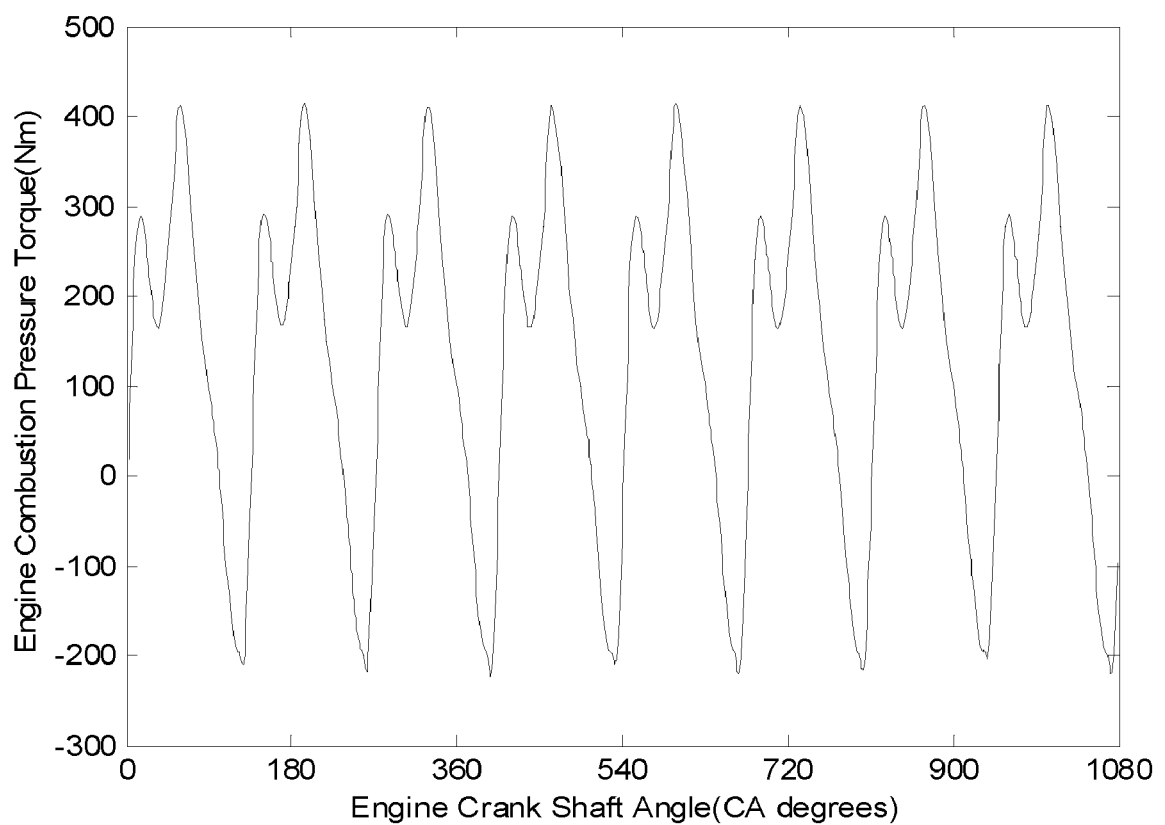
Figure 14:
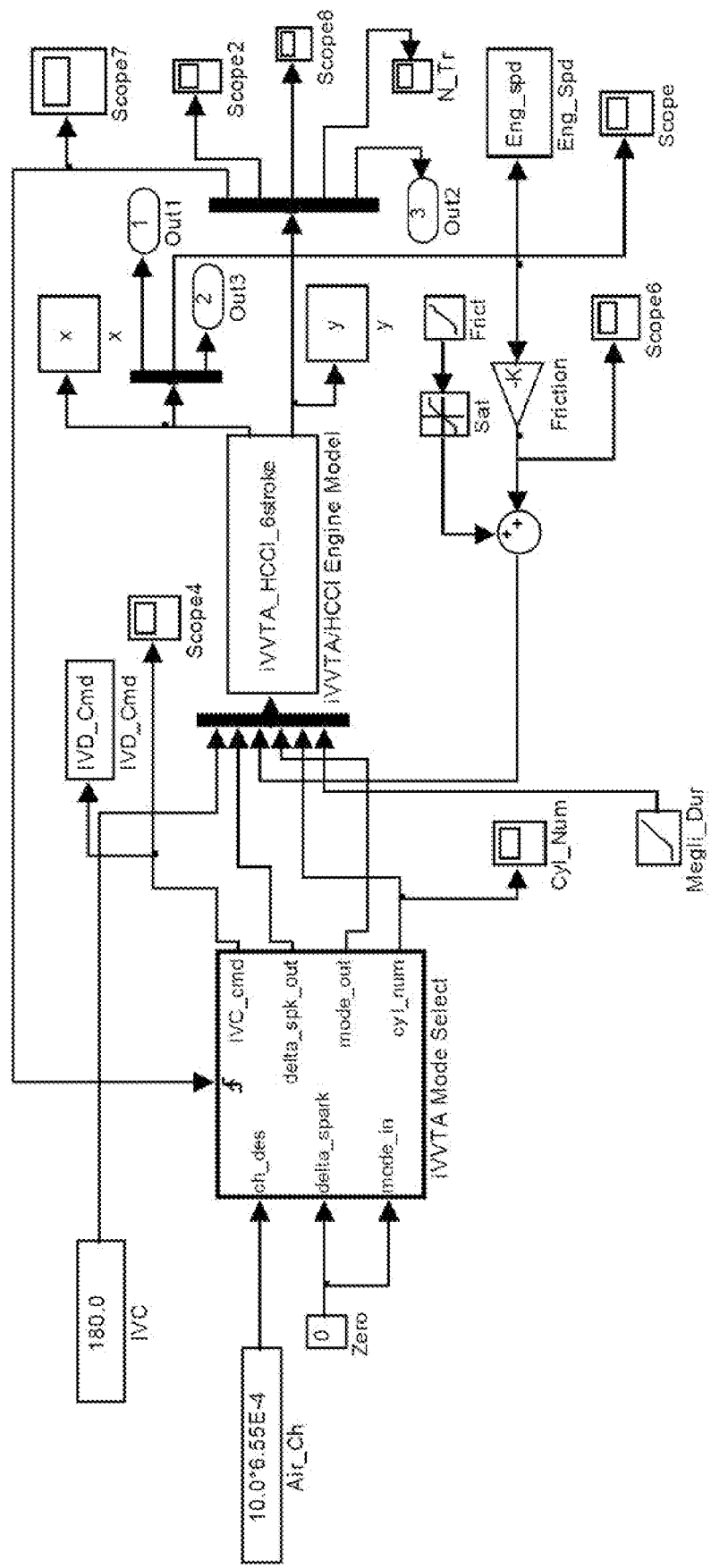
FIG. 14 illustrates a schematic representation of the experiment set-up.

In FIGS. 7-13, the combustion pressure torque for a three through eight cylinder engine running the 6-stroke cycle, with the intake and exhaust valve timing described above, are shown. In particular, FIG. 8 shows combustion pressure torque for three iVVTA cylinders operating in a six stroke HCCI mode. FIG. 9 shows combustion pressure torque for four iVVTA cylinders operating in a six stroke HCCI mode. FIG. 10 shows combustion pressure torque for five iVVTA cylinders operating in a six stroke HCCI mode. FIG. 11 shows combustion pressure torque for six iVVTA cylinders operating in a six stroke HCCI mode. FIG. 12 shows combustion pressure torque for seven iVVTA cylinders operating in a six stroke HCCI mode. FIG. 13 shows eight iVVTA cylinders operating in a six stroke HCCI mode. Thus, these figures show how the total torque produced by the engine may include variations that may be adjusted by increasing or decreasing the number of cylinders carrying out the six stroke operation. Further, FIG. 14 shows the iVVTA HCCI six stroke Simulink engine simulation setup.

As noted above, the 6-stroke cycle may introduce a torque imbalance or complicate the torque characteristic by generating two torque pulses per cylinder with a 360° CA spacing, within a 1080° CA cycle, vs. a single torque pulse per 720° cycle in a four stroke cycle. With a four stroke cycle the firing rate in CA degrees is equal to 720/Ncyl, where Ncyl is the number of firing cylinders and with a 6-stroke cycle the firing rate is (1.5*720/fcyc)/Ncyl, where fcyc is the number of combustion events per cycle. Therefore, for the same number of firing cylinders a six stroke engine has a 33% percent higher firing rate vs. a four stroke engine. However, the torque pulses are not evenly distributed within the six stroke cycle, which can lead to a torque imbalance and depending upon the phasing and number of firing six stroke cylinders can lead to a torque signature that has a lower torque pulsation frequency than the same number of four stroke cylinders.

As shown in FIGS. 8 and 11, the three and six cylinder torque pulsation frequency is one torque pulse per 360° and 180° CA respectively vs. 240° and 120° for a 4-stroke engine with the same number of cylinders. With Ncyl values that are not factors of three, the torque pulsation frequency is higher, but as the cylinder number increases (e.g. see the eight cylinder case in FIG. 13), the two positive torque pulses converge into a single positive torque pulse.

Therefore, as shown by the example simulation, it may be desirable where NVH is a concern to run a combination of six stroke and four stroke cylinders to achieve low over-all fuel consumption with reduced NVH and/or emissions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an engine having at least one cylinder including an intake valve and an exhaust valve, the method comprising:
   injecting a first amount of fuel into the cylinder;
   auto-igniting a first mixture of air and said first amount of fuel by compressing said first mixture;
   injecting a second amount of fuel into the cylinder after auto-igniting said first mixture;
   exhausting a portion of gasses from auto-ignition of said first mixture before combusting said second mixture;
   varying a timing of exhausting the portion of gasses from auto-ignition of said first mixture to vary a timing of combustion of said second mixture;
   combusting a second mixture of said second amount of fuel and gasses from auto-ignition of said first mixture;
   holding an intake valve of the cylinder closed between auto-igniting the first mixture and combusting the second mixture; and
   exhausting said combusted second mixture.

2. The method of claim 1, wherein combusting said second mixture includes auto-igniting the second mixture by compressing the second mixture and said second mixture is substantially homogeneous.

3. The method of claim 2, wherein the first mixture includes a homogeneous mixture of air and said first amount of fuel.

4. The method of claim 1, wherein combusting said second mixture includes igniting said second mixture by an ignition spark performed by a sparking device of the cylinder.

5. The method of claim 1, wherein combusting the second mixture is performed one stroke after auto-igniting the first mixture.

6. The method of claim 1, wherein the second mixture includes less excess oxygen than said first mixture.

7. The method of claim 1, where the cylinder is operating in a six stroke cycle.

8. The method of claim 1 further comprising:
   injecting a third amount of fuel into the cylinder after exhausting said combusted second mixture; and
   varying a timing of exhausting said combusted second mixture to adjust a timing of auto-ignition of a third mixture of air and said third amount of fuel.

9. The method of claim 8 further comprising combusting said second mixture by operating a sparking device of the cylinder and adjusting a timing of the spark performed by the sparking device to adjust the timing of auto-ignition of the third mixture.

10. The method of claim 1, wherein said second mixture is treated by a three-way catalyst arranged in an exhaust passage downstream of the cylinder.

11. The method of claim 1 further comprising, wherein the engine includes at least a second cylinder, operating the second cylinder in a four stroke cycle.

12. A method of controlling an exhaust stream produced by an internal combustion engine, said engine including at least one cylinder, the method comprising:
   operating the cylinder in a greater than four-stroke cycle including a first and a second combustion event;
   after a first combustion event of the cycle, exhausting a first quantum of gas from said cylinder; and
   after a second subsequent combustion event of the cycle, exhausting a second quantum of gas from said cylinder;
   wherein said first quantum of gas is less than said second quantum of gas and where said first quantum of gas includes a greater concentration oxygen than said second quantum of gas.

13. The method of claim 12 further comprising, wherein exhausting said first quantum of gas includes momentarily opening an exhaust valve of the cylinder at a first time during the cycle and exhausting said second quantum of gas includes opening the exhaust valve at a second time during the cycle; and varying said first time of the exhaust valve opening to vary a time that the second combustion event is initiated.

14. The method of claim 12, wherein the first quantum of gas includes an air to fuel ratio greater than 30 to 1 and the second quantum of gas includes an air to fuel ratio less than said first quantum of gas.

15. A method of operating an engine including at least one cylinder, wherein said cylinder further includes an intake valve and an exhaust valve, comprising:
   opening the intake valve to admit a gas containing oxygen into the cylinder;
   injecting a first amount of fuel into the cylinder;
   combusting a first substantially homogeneous mixture of said first amount of fuel and said gas by compressing said first mixture;
   injecting a second amount of fuel into the cylinder;
   combusting a second substantially homogeneous mixture of said second amount of fuel and at least a portion of said gas by compressing said second mixture;
   opening and subsequently closing the exhaust valve between when the first mixture is combusted and the second mixture is combusted to vary a timing of when said second mixture is combusted; and
   wherein said first mixture includes a greater excess of oxygen than said second mixture, where the intake valve is subsequently closed for at least a period of time between when the first mixture is combusted and the second mixture is combusted.

16. The method of claim 15 further comprising, wherein the engine includes a second cylinder, varying an operation of the second cylinder between a four stroke cycle including a single power stroke and a six stroke cycle including two power strokes based on an operating condition of the engine.

17. The method of claim 16, wherein said operating condition includes at least one of a performance mode selected by a user, a condition of a transmission coupled to the engine, and a level of vibration resulting from operation of the engine.

18. A method of operating an engine having at least one cylinder including an intake valve and an exhaust valve and a second cylinder, the method comprising:
injecting a first amount of fuel into the cylinder;
auto-igniting a first mixture of air and said first amount of fuel by compressing said first mixture;
injecting a second amount of fuel into the cylinder after auto-igniting said first mixture;
combusting a second mixture of said second amount of fuel and gasses from auto-ignition of said first mixture;
holding an intake valve of the cylinder closed between auto-igniting the first mixture and combusting the second mixture;
exhausting said combusted second mixture;
operating the second cylinder in a four stroke cycle while the first cylinder operates with at least said first and second combustion over at least six strokes; and
adjusting torque in at least one of the first and second cylinder to counteract a torque imbalance that would otherwise occur due to the difference in the number of strokes of the cylinder cycles.

19. The method of claim 18 further comprising adjusting the torque in response to at least one of a performance mode selected by the driver, a level of vibration produced by the engine and/or transmitted to a driveline of the engine, and a condition of a transmission coupled to the engine.

* * * * *